United States Patent [19]
Nagumo

[11] Patent Number: 6,026,214
[45] Date of Patent: Feb. 15, 2000

[54] DIGITAL VIDEO RECORDING APPARATUS AND METHOD

[75] Inventor: Masahiko Nagumo, Tokyo, Japan

[73] Assignee: Sony Corporation, Tokyo, Japan

[21] Appl. No.: 08/821,316

[22] Filed: Mar. 20, 1997

[30] Foreign Application Priority Data

Mar. 27, 1996 [JP] Japan .................................. 8-097679

[51] Int. Cl.$^7$ ............................. H04N 5/911; H04N 5/95; H04N 5/91

[52] U.S. Cl. ................................ 386/113; 386/88; 386/46

[58] Field of Search ............................ 386/113, 46, 124, 386/1, 21, 48, 85, 88, 95, 114, 115, 76, 84, 28, 13; 360/32; H04N 5/911, 5/95, 5/91

[56] References Cited

U.S. PATENT DOCUMENTS 5,724,475  3/1998  Kirsten ..................................... 386/109
5,892,982  4/1999  Mitsuda et al. .......................... 395/882

*Primary Examiner*—Robert Chevalier
*Attorney, Agent, or Firm*—Frommer Lawrence & Haug, LLP.; William S. Frommer

[57] ABSTRACT

A system for recording AVS data (Audio Video and Subcode data) onto a magnetic tape that contains previously recorded data. When performing an AVS insertion according to the invention, the ITI (Insert and Track Information) portion of the previously recorded data is preserved while the AVS portion of the previously recorded data is overwritten. In order to match the frame phase of the old ITI data with the frame phase of the new AVS data the leading edge of a head switching signal is monitored. By counting the number of occurrences of the leading edge of the head switching signal, cuing the insertion of the new AVS data to the count, and resetting the count upon the occurrence of a frame change in the previously recorded data, the new AVS data and the previously recorded ITI data are frame synchronized.

30 Claims, 14 Drawing Sheets

OVERWRITE MARGIN

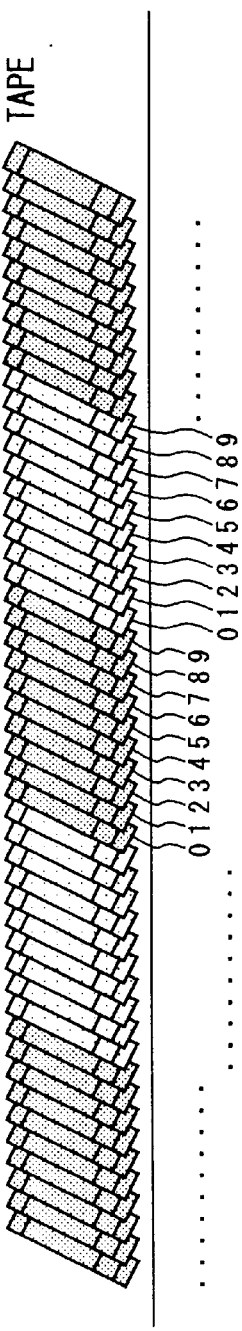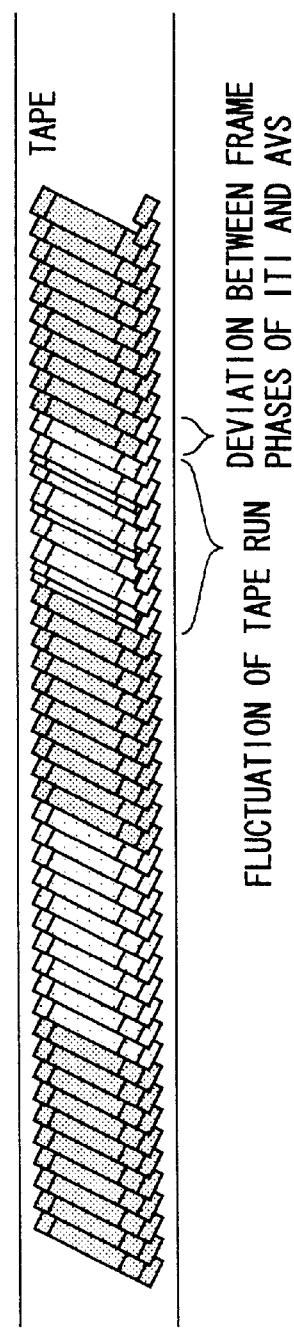
Fig. 4A
Fig. 4B

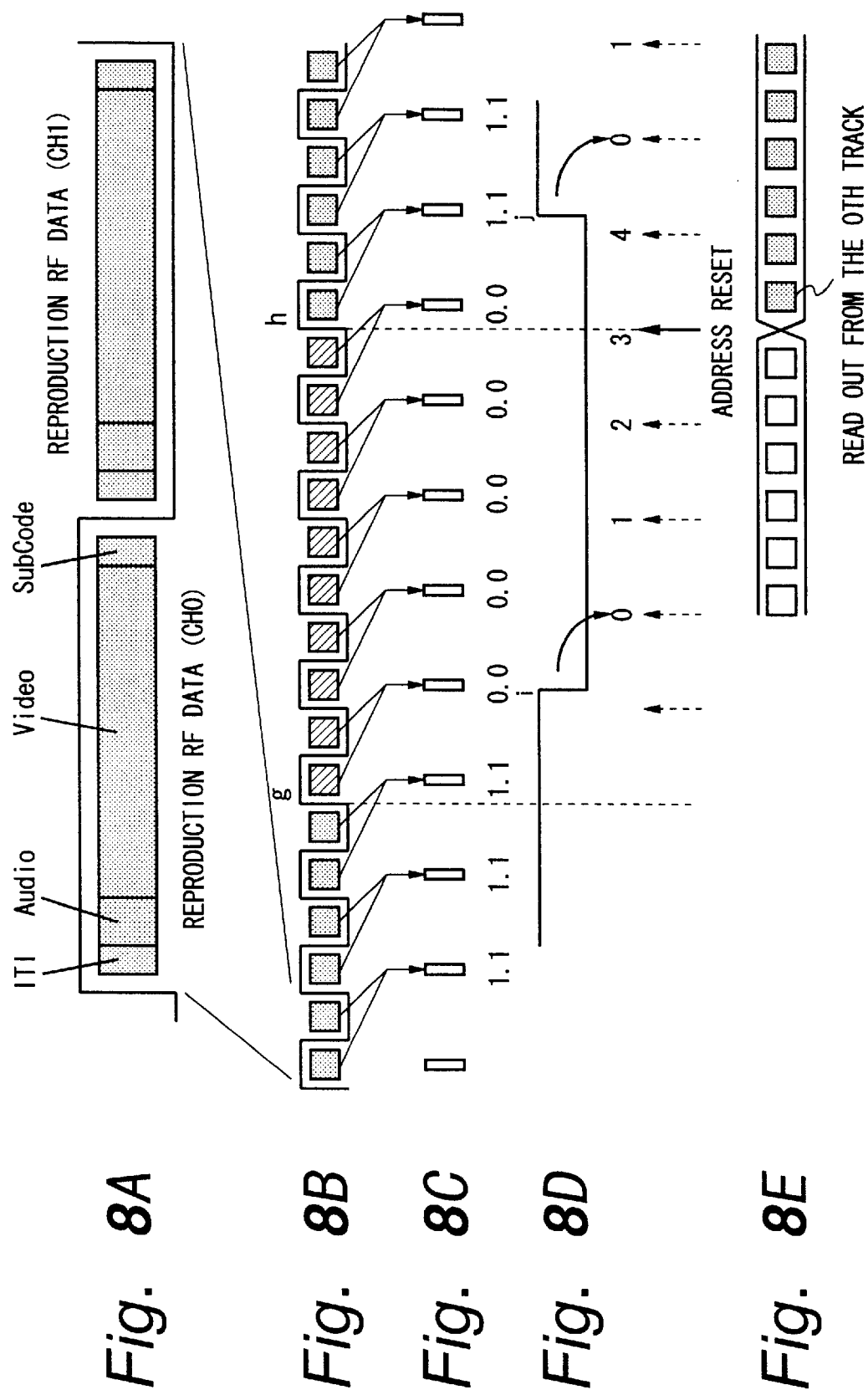

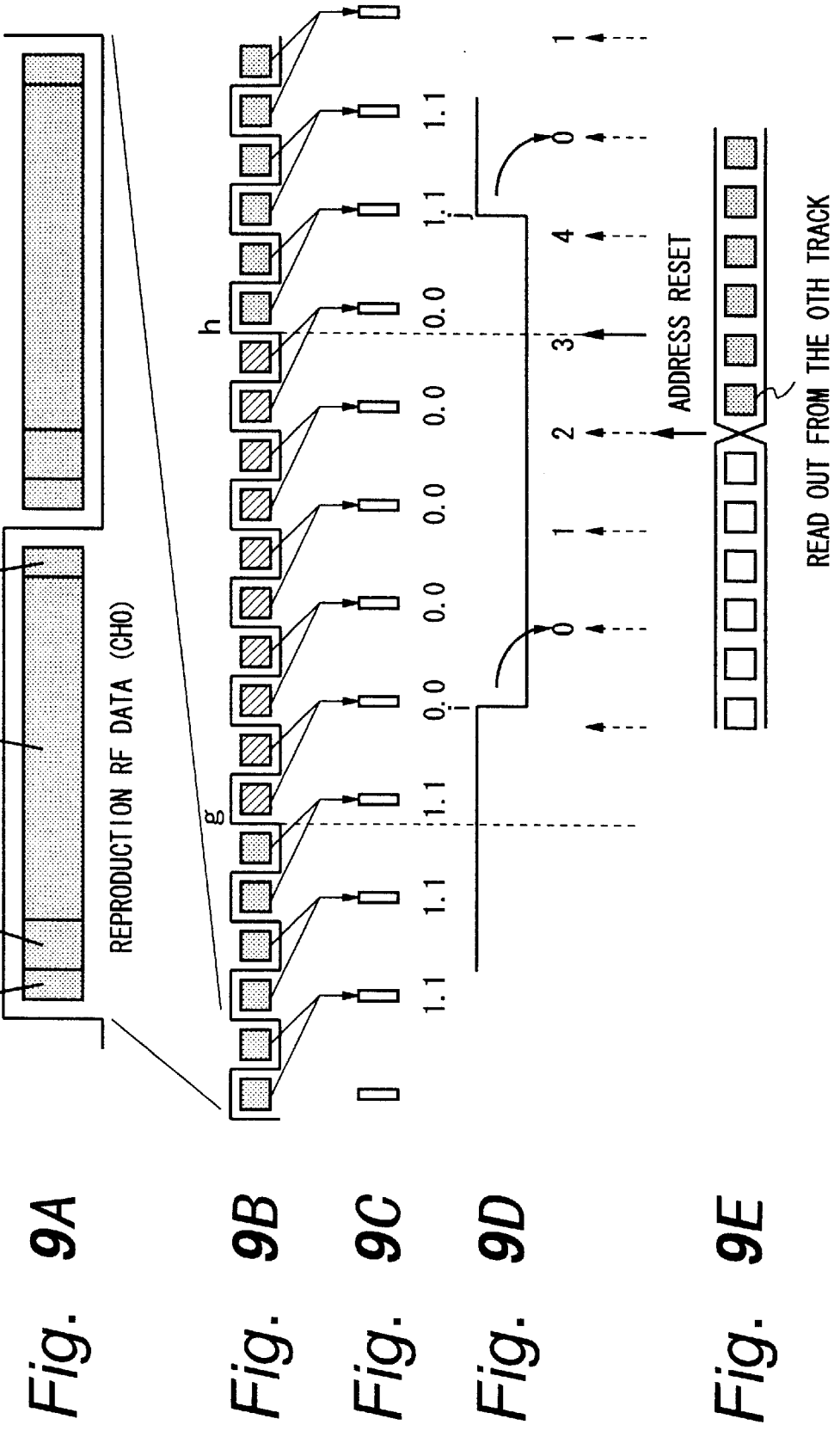

DIGITAL VIDEO RECORDING APPARATUS AND METHOD

FIELD OF THE INVENTION

This invention relates to the recording and reproducing of data through the use of magnetic tape, and more particularly to the recording of data onto a magnetic tape that contains previously recorded data.

BACKGROUND OF THE INVENTION

It is well known in the audio/video arts that AVS (Audio Video and Subcode) data may be recorded onto magnetic tape for reproduction at a later time. A typical recording/reproducing apparatus implements a helical scanning method in which the AVS data is recorded in tracks that are obliquely formed on the magnetic tape by rotary heads. FIG. 1 illustrates the formation of helical tracks on a magnetic tape. As seen in the figure, the tracks are formed so that each track overlaps with its neighboring tracks. In an NTSC compatible recording, a video frame is recorded in ten tracks. In a PAL compatible recording, a video frame is recorded in twelve tracks. The recording shown in FIG. 1 is a NTSC compatible recording, with shading provided to identify individual frames. The tracks within each frame are numbered sequentially from 0 to 9.

FIG. 2 shows the format of an individual track. The left side of the track is the head entrance side and the right side is the head exit side. The track includes an ITI (Insert and Track Information) area, an audio data area, a video data area, and a subcode area. Interspersed between these areas are IBGs (Inter Block Gaps), in which no data is recorded. The audio data, video data, and subcode data are collectively referred to as AVS data. The ITI area contains administrative information about the track, for example information about the track's size, or information about the frame in which the track belongs.

There are many applications for a system of the foregoing type. One such application is the editing of a previously recorded tape. Often, when editing a previously recorded tape, it is desirable to overwrite the AVS portion of previously recorded tracks without disturbing the ITI portion of those tracks. Track overwriting of this kind is hereinafter referred to as "AVS insertion".

In order to successfully perform an AVS insertion, it is necessary to match the phase of the frame for the original AVS data (hereinafter "the background data") to the phase of the frame for the new AVS data. The phase of the frame for the original AVS data may be obtained from the data itself, however this presents a problem since the original data is overwritten during the insertion. Often, this problem is addressed by including one or more pre-reading heads in the system for the purpose of reading the original track(s) and determining the phase of the background frame prior to overwriting. The problem with the pre-reading method is that it cannot correct for deviations of frame phase that might occur during the insertion.

FIGS. 3A and 3B illustrate one type of frame phase deviation that may occur during an AVS insertion performed according to the pre-reading method. FIG. 3A shows an original NTSC recording that contains a discontinuity at the point indicated by the asterisk. As can be seen from the figure, the original recording includes an incomplete frame that has only 6 tracks instead of the usual 10. When the pre-reading method is used to write over the recording of FIG. 3A, the recording of FIG. 3B results. The deviation apparent in FIG. 3B is caused by the inability of the pre-reading heads to recognize the discontinuity in the original recording. As the insertion is performed the pre-reading heads reach the 0th track of the incomplete original frame and determine the frame phase from the information in that track. The tracks of the new frame are then sequentially written over the tracks of the original frame without regard to the discontinuity. Thereby resulting in an incorrect matching of the new AVS data and old ITI data.

FIGS. 4A and 4B illustrate a second type of frame phase deviation that may occur during an AVS insertion performed according to the pre-reading method. Unlike the tracks in FIG. 3A, the tracks in FIG. 4A are correctly formed in accordance with the NTSC system. In this second illustration the frame phase deviation is caused when the system's servo is disturbed during the AVS insertion. For example, the servo may experience a mechanical shock during insertion. As can be seen from FIG. 4B, such a disturbance results in incorrect placement of the newly written tracks, and therefore gives rise to a frame phase deviation.

OBJECTS AND SUMMARY OF THE INVENTION

It is therefore an object of the invention to provide a data recording apparatus and a data recording method that can detect frame phase deviations which might occur during an AVS insertion and that can correct such deviations.

When performing an AVS insertion according to the invention, the ITI portion of the previously recorded data is preserved while the AVS portion of the previously recorded data is overwritten. In order to match the frame phase of the old ITI data with the frame phase of the new AVS data the leading edge of a head switching signal is monitored. By observing the occurrence of a frame changes in the previously recorded data, and cuing the insertion of new AVS to the detected frame changes, new AVS data and the previously recorded ITI data are frame synchronized.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 4A and 4B illustrate a second type of frame phase deviation that may occur during an AVS insertion performed according to the pre-reading method.

FIG. 8A illustrates the trace of two helical tracks, one by each head of a VCR.

FIG. 8B illustrates a series of traces made by two heads of a VCR in accordance with the NTSC standard.

FIG. 8C illustrates the assignment of PF values to the traces of FIG. 8B.

FIG. 8D shows the PF data signal generated according to the PF assignments of FIG. 8C, along with an internal head switching count maintained by the microcomputer according to a first embodiment of the invention.

FIG. 8E illustrates the timing of an insertion write operation according to a first embodiment of the invention.

FIGS. 9A–9D repeat what is shown in FIGS. 8A–8D.

FIG. 9E illustrates the timing of an insertion write operation according to a modified first embodiment of the invention.

DETAILED DESCRIPTION OF CERTAIN PREFERRED EMBODIMENTS

Two preferred embodiments will be described herein below; however, it will be appreciated that the present invention is not to be limited solely to these embodiments, and other embodiments and examples of the instant invention are intended to be encompassed by the attached claims. The first embodiment described is directed to NTSC compatible systems. The second embodiment is directed primarily toward PAL compatible systems, although it may be used in NTSC systems as well. For each of the described embodiments two variants are described. In the first variant of each embodiment, the frame phase of the old ITI data and of the new AVS data is matched by adjusting the time at which new AVS data is recorded on the tape. In the second variation of each embodiment, the frame phase of the old ITI data and of the new AVS data is matched by adjusting the speed of a capstan motor during the AVS insertion.

Figure 1:
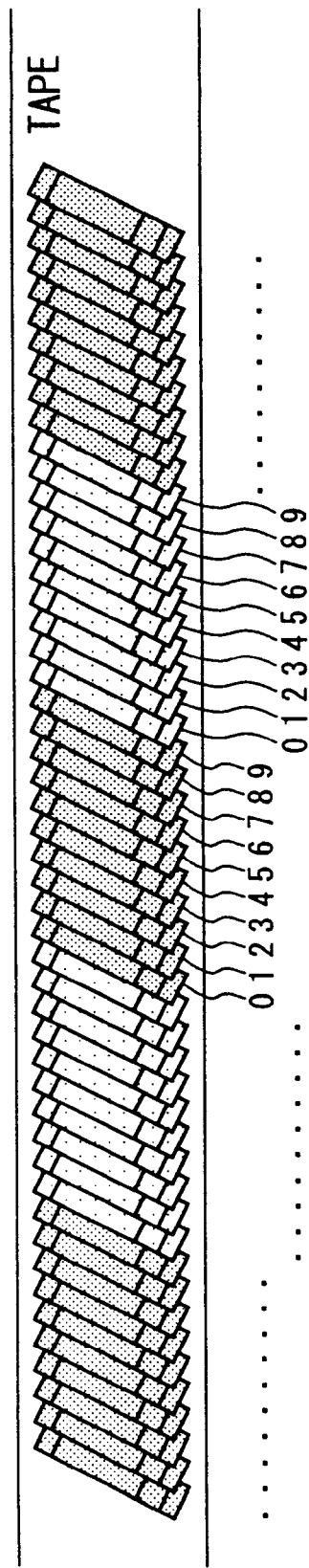
FIG. 1 illustrates the formation of helical tracks on a magnetic tape.
Figure 2:
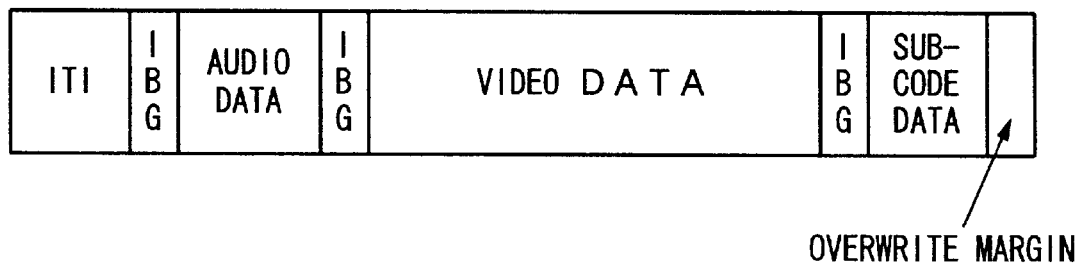
FIG. 2 shows the format of an individual helical track.
Figures 3A, 3B:
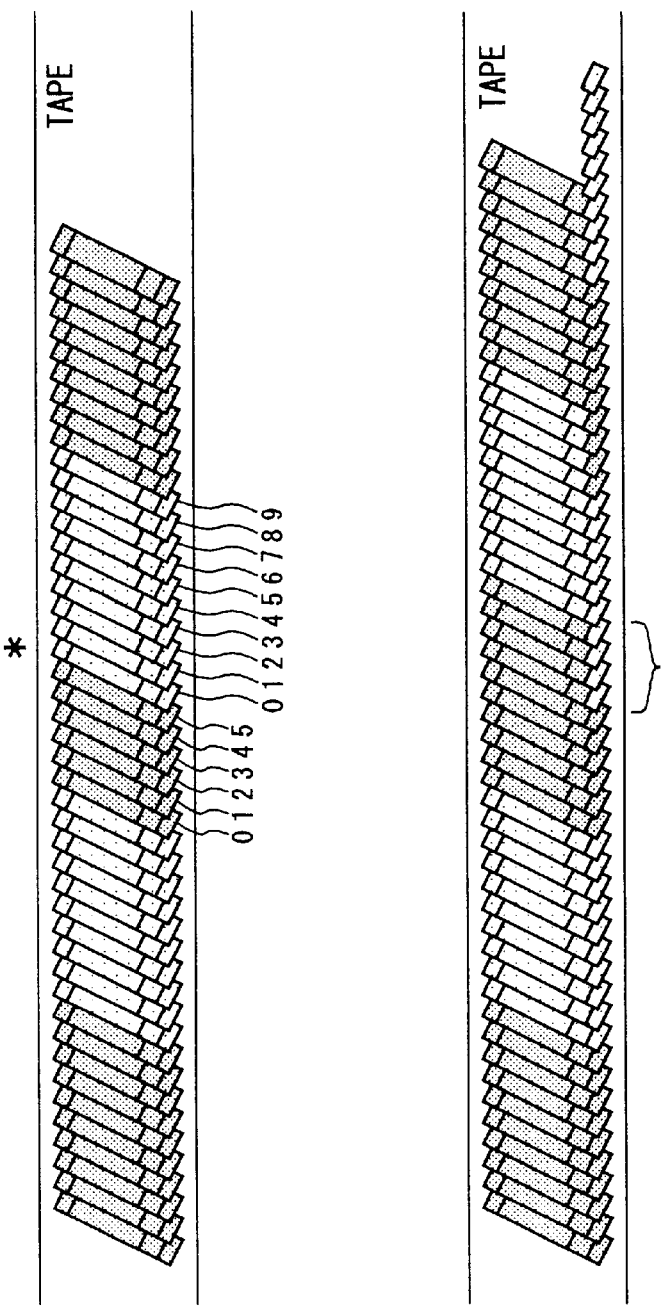
FIGS. 3A and 3B illustrate one type of frame phase deviation that may occur during an AVS insertion performed according to the pre-reading method.
Figure 5:
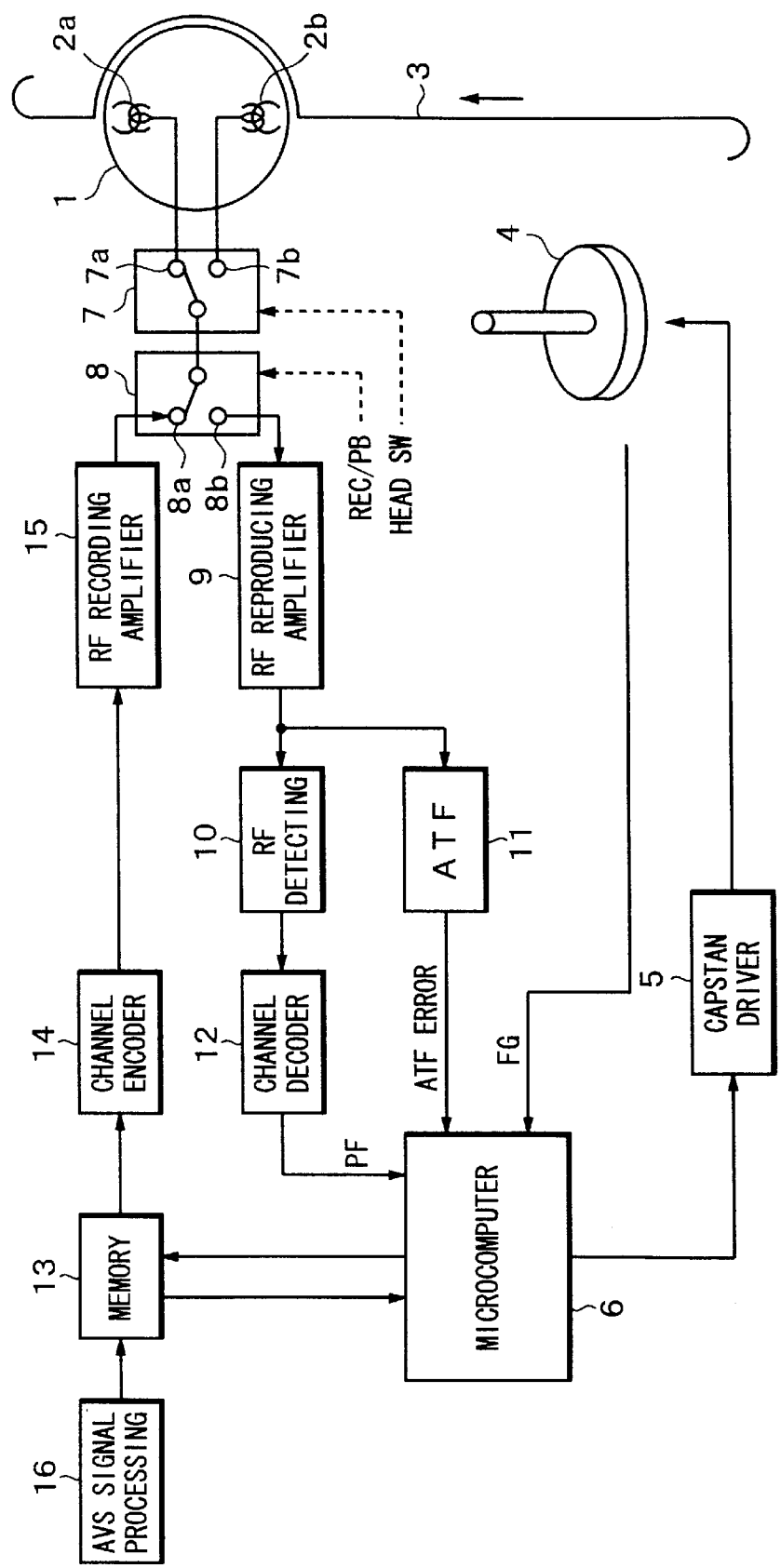
FIG. 5 is a schematic diagram of a recording/reproducing unit of a VCR in accordance with the invention.

Prior to describing the preferred embodiments, a Video Cassette Recorder (VCR) suitable for use with the invention will be described. FIG. 5 is a schematic diagram of a recording/reproducing unit of a VCR. The unit of FIG. 5 is suitable for use in both the NTSC and PAL embodiments of the invention. As can be seen from the figure data is written to a magnetic tape 3 through two heads 2a and 2b which are positioned in diametric opposition to one another mounted on a rotary drum 1. The tape is obliquely wound around the rotary drum at a wrap angle of about 180°. As the tape runs in the indicated direction, the drum rotates at a predetermined speed so that heads 2a and 2b trace angular tracks across the tape. These tracks are commonly referred to as slant tracks or helical tracks. In the configuration shown each head traces one track across the tape so that two tracks are formed each time the drum rotates 360°. In addition, the gaps of heads 2a and 2b are disposed at different angles in accordance with azimuth recording techniques. The data recorded or read by head 2a will be referred to as channel 0 (CH0) information, while the data recorded or read by head 2b will be referred to as channel 1 (CH1) information.

The speed of the magnetic tape is controlled by a capstan motor 4. The capstan motor is controlled by a capstan driver 5 which is, in turn, controlled by a microcomputer 6. An example of a microcomputer suitable for use with the invention is a microprocessor. The microcomputer also receives feedback from the capstan motor in the form of an FG signal. The frequency of the FG signal is proportional to the rotational speed of the motor. The microcomputer uses the FG signal along with a PF data signal and an ATF (Automatic Track Finding) error signal, to be explained later, to control the speed of the motor.

During recording the AVS data to be recorded is supplied by an AVS signal processing unit 16 and is stored in a memory 13. In response to a command signal from the microcomputer the stored data is read from the memory to a channel encoder 14. In the channel encoder the AVS data is formatted for writing to the magnetic tape. The data is then passed to an RF recording amplifier 15 and on to terminal 8a of a switching circuit 8.

Switching circuit 8 switches the path of the head signals in response to a recording/reproduction control signal (REC/PB) supplied from microcomputer 6. The switch is set to the 8a (or record) position when the unit is recording and set to the 8b (or playback) position when the unit is reproducing. During an AVS insertion the switch 5 changes positions in mid-track. Thus, for AVS insertion purposes the REC/PB signal is synchronized with the rotating head such that as a head passes over an ITI area of a track the switch is in the 8b position (reproduction) and while a head passes over an AVS area of a track the switch is in the 8a position (recording).

Switching circuit 8 is coupled to a switching circuit 7. Switching circuit 7 selects between heads 2a and 2b according to a head switching signal (HEAD SW) supplied from microcomputer 6. When head 2a is engaging the tape the switch is set to position 7a and head 2a is selected, when head 2b is engaging the tape the switch is in position 7b and head 2b is selected. Accordingly, the HEAD SW signal is synchronized with the rotary drum so that switch 7 changes positions for every 180° rotation of the drum.

The function of switches 8 and 7 may be summed up as follows. When recording through head 2a the switch positions are 8a and 7a, respectively. When reproducing through head 2a the positions are 8b and 7a. Similarly, when recording through head 2b the switch positions are 8a and 7b, respectively, and when reproducing through head 2b the positions are 8b and 7b.

Reproduction data passing through terminal 8b is sent to an RF reproducing amplifier 9. During AVS insertion the reproduction data is the ITI data, and therefore for purposes of this description the terms ITI data and reproduction data will be used interchangeably. In any event, the ITI data is amplified by amplifier 9 and passed to an RF detecting circuit 10 and an ATF detecting circuit 11. In the RF detecting circuit the data undergoes an equalization and detection process. The equalized and detected ITI data is then passed to a channel decoder 12 where it is converted to a digital signal. The digital ITI data is passed to the microcomputer. It is noted here that the digital ITI data includes Pilot Frame (PF) data which is used in the first embodiment of the invention to detect the frame phase of the data that is overwritten in an AVS insertion.

As mentioned above, the output of amplifier 9 is also passed to the ATF detecting circuit. In the ATF detecting circuit the ATF error is detected from the supplied ITI data signal. The ATF error is then passed to the microcomputer 6 where it is used along with the PF signal and FG signal to generate a speed command control signal. The speed command control signal, in turn, controls the speed of the capstan motor through the capstan driver.

For clarity of presentation, controlling the capstan motor speed may be viewed as a three part procedure, an ATF procedure, an FG procedure, and a frame phase procedure. A description of the ATF procedure follows. Descriptions of the FG and frame phase procedures are provided later.

Figure 6:
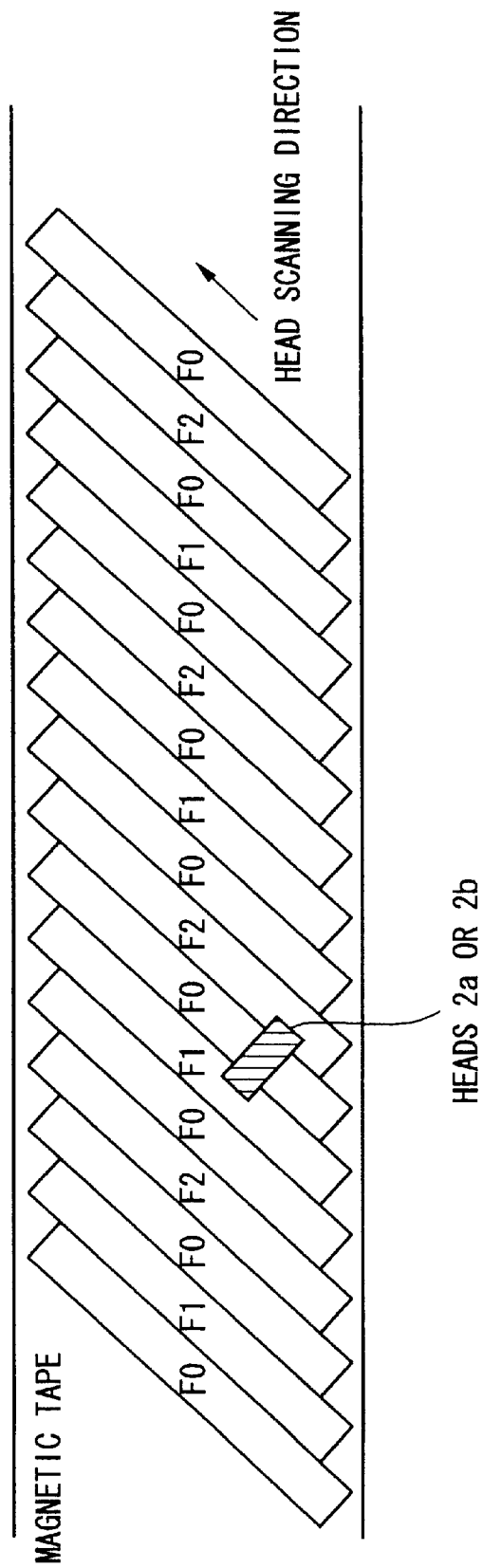
FIG. 6 shows an example of a relationship between helical tracks and ATF pilot signals.

According to the ATF procedure, for each traclk recorded to the magnetic tape, an ATF pilot signal is included in the ITI area. FIG. 6 shows an example of the preferred relationship between tracks and ATF pilot signals. As can be seen from the figure, three types of ATF pilot signals are used, F0, F1, and F2. These signals are assigned to consecutive tracks according to the following pattern: . . . . F0, Fl, F0, F2, F0, F1, F0, F2 . . . . Thus, as the tracks are recorded on the tape the pilot signal pattern repeats every four tracks. For convenience, the pilot signals are identified according to their frequency content.

Figure 7A:
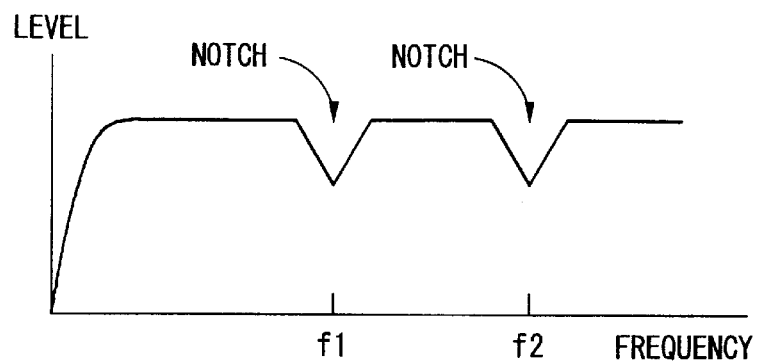
FIGS. 7A to 7C show the frequency content of three types of ATF pilot signals.
Figure 7B:
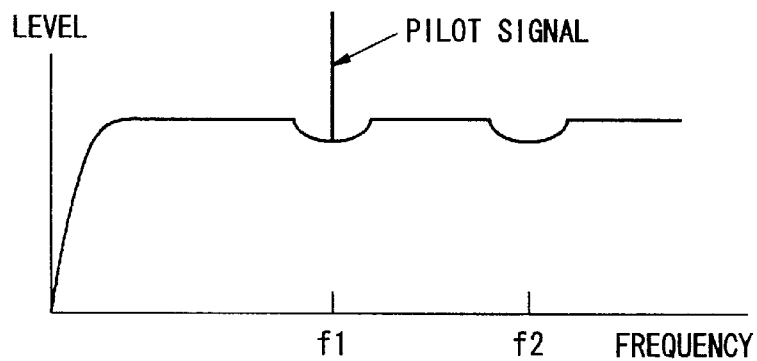
Figure 7C:
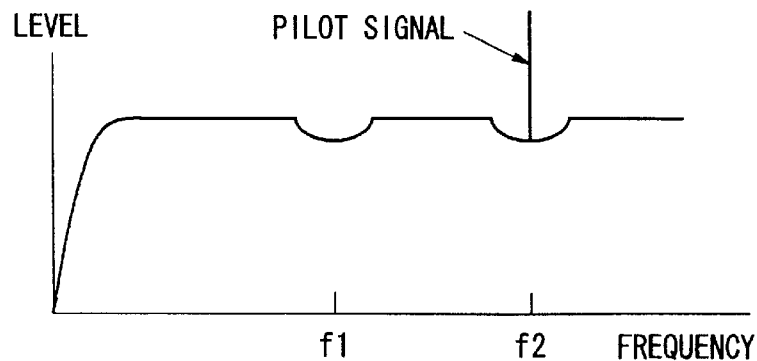

FIGS. 7A to 7C show the frequency content of three types of ATF pilot signals. As shown in FIG. 7A, F0 denotes a pilot signal having a relatively flat spectra with a notch centered around a frequency f1 and a notch centered around a frequency f2 (F0 may be said to denote the absence of a pilot signal). FIG. 7B shows that the F1 pilot signal spectra includes a spike at frequency f1, and FIG. 7C shows that the F2 pilot signal spectra includes a spike at frequency f2.

The F1 and F2 pilot signals may be generated through 24–25 conversion. The conversion is performed by adding one bit to the AVS and ITI data (the AVS and ITI data including an error correction code), such that the IBG and ATF pilot signals are generated by the recording code train itself. By adding one bit to the data the two distinct ATF pilot signals are generated.

During reproduction of a track, the head reading the track reads the ATF pilot signal along with the rest of the ITI data. As can be seen from FIG. 6, the heads trace a path wider than the individual tracks, and therefore when tracing a particular track a head rides over the adjacent tracks. In this manner the head picks up the pilot signal of the track it intends to read as well as the pilot signals which are picked up from adjacent tracks (referred to as crosstalk pilot signals). When the head is centered over the track it intends to read, the magnitude of the difference between the detected pilot signal for the intended track and the detected crosstalk pilot signal from an adjacent track will he equal to a predetermined value (or "target value"). By setting the ATF error equal to the magnitude of the difference between the detected pilot signal for the intended track and the detected crosstalk pilot signal for an adjacent track, and then comparing the ATF error to the target value, a misalignment value is obtained. If the misalignment value is zero, the head is aligned with the intended track. The misalignment value is used in a phase servo operation that is performed by the microcomputer as part of the three part procedure for controlling the capstan motor. The effect of the phase servo operation is to drive the misalignment value to zero so that the head is aligned with the intended track.

Having described the general operation of the VCR of FIG. 5, the first embodiment of the invention will now be described in detail. FIGS. 8A to 8E are timing diagrams useful for describing the first embodiment. FIG. 8A illustrates the trace of two tracks, one by each head. Superimposed on the traces is the head switching signal which is set to "High" when head 2a traces a track, and is set to "Low" when head 2b traces a track.

FIG. 8B illustrates a series of traces made by heads 2a and 2b. The figure depicts an NTSC system, in which 10 consecutive tracks make up a frame. The occurrence of new frames is marked by the letters "g" and "h". Accordingly, the figure depicts two incomplete frames and one complete frame, the complete frame being located between the "g" and "h" symbols. Again, the head switching signal is superimposed on the traces.

As mentioned above, the ITI portion of each track contains the PF data for the track. The PF data for a particular track is either "1" or "0". All tracks belonging to a frame are assigned the same PF value, and the PF value alternates on a frame by frame basis so that no two consecutive frames have the same PF value. The assignment of PF values is illustrated in FIG. 8C. As can be seen from FIG. 8C in conjunction with FIG. 8B, the PF values of scanned tracks are read one at a time, however they are reported to the microcomputer two at a time. Furthermore, the reports are delayed by one track time. FIG. 8D shows the PF data signal. In accordance with the described PF scheme, the PF data signal is high until it reaches point "i", low between points "i" and "j" and high after point "j".

In addition to keeping track of the PF value, the microcomputer counts the leading edge occurrences of the head switching signal. It resets the count when a change in the PF value is detected (when a new frame is read). Referring to FIG. 8D, it can be seen that the leading edge count is reset to 0 when a new frame is detected and is increased to 1, 2, 3, and finally to 4 when the last two tracks of the frame are read. After the counter reaches 4 the next frame is detected and the counter is reset to 0. In this scheme the time at which the first track of a frame is read is equal to the time at which the counter is increased to 3. Thus, when performing an AVS insertion, the system can detect the frame phase of the originally recorded data; and a new frame of recorded data begins every time the count is increased to 3.

In order to synchronize the insertion of AVS data with the original recorded data, the insertion data is stored in memory 13 and the microcomputer sets its memory pointer to the address of the 0th track of the first insertion frame. When the counter increases to 3, the microcomputer sends a read address reset signal to the memory and writing of the insertion data to the magnetic tape is begun. In this way the 0th track of the insertion is written in the location occupied by the 0th track of the original data. (FIG. 8E illustrates the timing of the insertion write operation.) That is, by beginning to write the insertion data to the tape when the count increases to three the new data frame phase is equal to the recorded data frame phase. Since the writing of a new frame of AVS insertion data is keyed to PF value changes in the original data, the frame phases remain in synch even in the presence of a deviation.

After AVS insertion, the frame phase of the previously recorded data serves as the new frame phase for the newly inserted AVS data. This follows from the nature of the insertion operation, in which the ITI portion of the previously recorded data is preserved while the AVS portion of the previously recorded data is overwritten. Thus, the frame phase matching described above is necessary to insure that the proper frame phase is being assigned to the inserted data. If the frame phase of the inserted data and the previously recorded data are not properly matched, the edit will not appear at the correct position on the tape. For example, an editor may wish to add a special effect to a previously recorded tape. If the frame phase of the added effect and the frame phase of the previous recording do not match, the effect will not appear at the desired position on the tape.

A modified first embodiment will now be described with reference to FIGS. 9A–9E, 10 and 11. As was the case with the unmodified first embodiment, the modified first embodiment is applicable to an NTSC system, and is therefore described in the NTSC context. FIGS. 9A–9D illustrate how the modified first embodiment, like the unmodified first embodiment, reads the PF data of the original data, maintains a head switching signal count, and resets the count when the PF data changes. However, the modified embodiment does not adjust the write time of the insertion data to conform to the occurrence of frame changes in the recorded data. Rather, the tape speed is adjusted to conform the write time of the insertion data to the occurrence of frame changes in the recorded data.

FIG. 9E shows an example of insertion data that is being written to a tape. In the example depicted in FIGS. 9A–9E, the frame phase of the insertion data is advanced relative to the frame phase of the original data by two tracks. That is, the head switching count is equal to 2 at the point where the frame of the insertion data changes while the frame change of the original data always occurs on a count of 3. The deviation between the new data frame phase and old data frame phase is detected by monitoring the read address reset signal. The next frame of insertion data begins when the signal is sent from the microcomputer to the memory, and the head switching count is noted at this time. If the noted count is not equal to 3 there is a frame phase deviation. The amount of the deviation is determined by comparing the noted count to the predetermined count of it. The tape speed is then adjusted according to the amount of deviation so that the read address signal occurs when the head switching count is equal to 3. By adjusting the motor speed to correct for frame phase deviations, the new data frame phase and recorded data frame phase are matched. Once the correction is complete the tape is returned to its normal operational speed. As was the case in the unmodified first embodiment, upon completion of the AVS insertion, the previously recorded frame phase serves as the new frame phase for the newly written data.

The adjustment of the tape speed according to the detected deviation is the frame phase part of the capstan motor control procedure. As mentioned above, the capstan motor speed is controlled according to a three part procedure: an ATF procedure, an FG procedure, and a frame phase procedure. The ATF and frame phase procedure have been described. The FG procedure will now be described and the relation between the three procedures also will be described.

Figure 10:
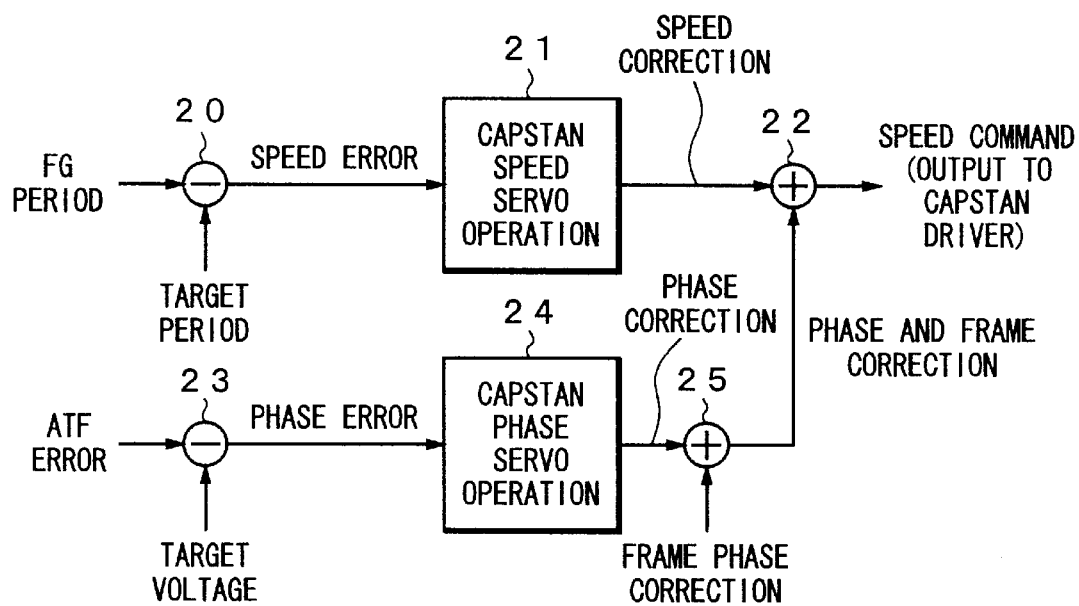
FIG. 10 shows schematically how a microcomputer controls the speed of a VCR's capstan motor according to the invention.

FIG. 10 shows schematically how the microcomputer controls the capstan motor speed. As can be seen from the figure, control of the motor involves two primary operations, a capstan speed servo operation 21 and a capstan phase servo operation 24. The speed servo operation implements the FG part of the control procedure. Since the period of the FG signal is proportional to motor speed, this signal may be compared to a target period to insure that the normal operating speed of the motor (0 ATF error, 0 frame phase deviation) is as desired. Thus, assuming no ATF error and no frame phase deviation, a target period may be determined from the desired motor speed. The target period is passed to a subtractor 20. The period of the FG signal—determined by examining the FG signal from the motor—is also passed to subtractor 20. The difference between the target period and the FG period is the motor speed error. The motor speed error is used by the speed servo operation to generate a speed correction signal that is sufficient to drive the motor to the desired speed, thereby completing an FG feedback loop.

Now, the relation between the FG procedure and the ATF and frame phase procedures will be described. In FIG. 10, comparison of the ATF error and a target voltage (described above) is performed by a subtractor 23 and the resulting misalignment value (or "phase error") is passed to the phase servo operation. The output of the phase servo operation is a phase correction signal that is sufficient for correcting misalignment between a head and the track it intends to trace. However, in the case of the modified first embodiment, any detected frame phase deviations must be accounted for. Therefore, the phase correction is passed to an adder 25 where it is added to a frame phase correction signal. The frame phase correction signal is derived from the detected frame phase deviation and alone would be sufficient to adjust the capstan motor speed to correct for the detected deviation. The output of adder 25 is a phase and frame correction signal which is added to the speed correction signal by adder 22. The output of adder 22 is a speed command that is passed the capstan driver for use in setting the motor speed.

Figure 11:
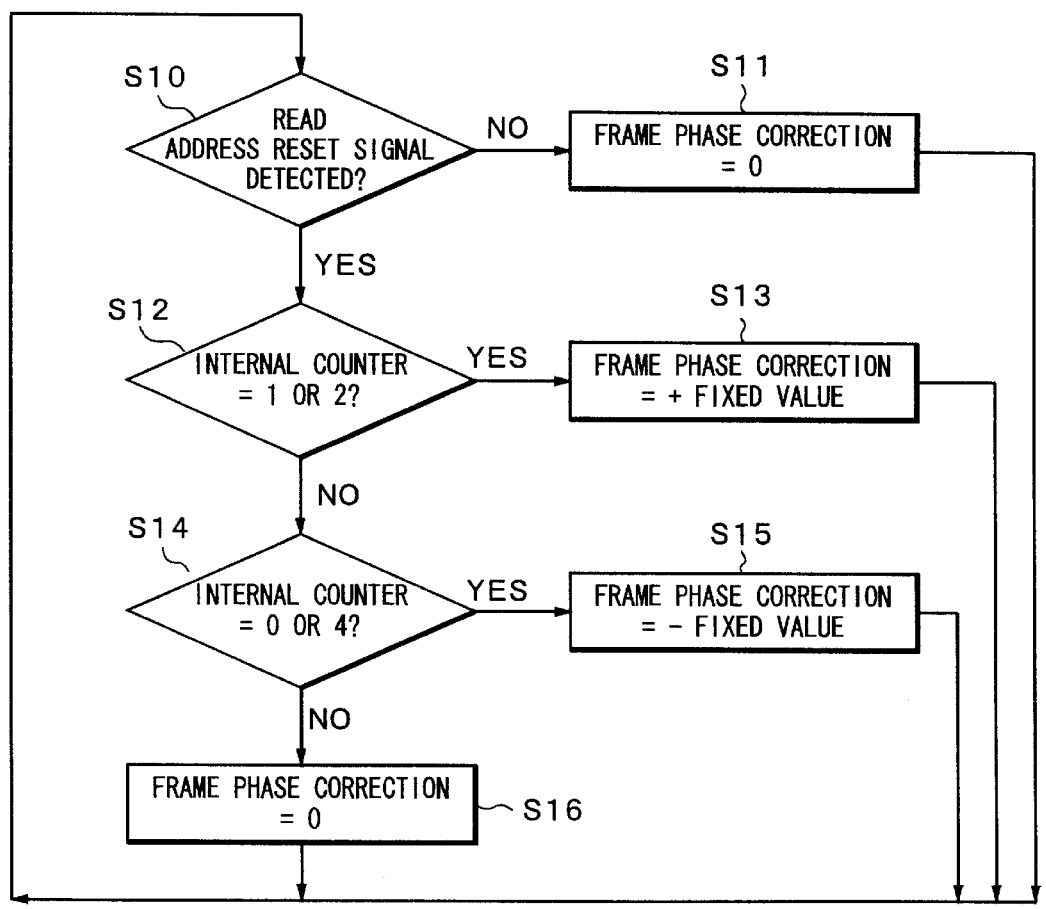
FIG. 11 is a flowchart depicting the steps taken in computing a frame phase correction signal according to a modified first embodiment of the invention.

FIG. 11 is a flowchart depicting the steps taken in computing the frame phase correction signal. The first step is to check for the occurrence of the read address reset signal (inquiry S10). If the read address reset signal has not been detected it is assumed that the track being written is not the 0th track and no frame phase correction is performed (frame phase correction set to 0 in instruction S11). When a read address reset signal is detected the head switching count is checked. Inquiry S12 determines if the count is equal to "1" or "2". If the Count is equal to 1 or 2, it is assumed that the new data frame phase is advanced relative to the old data frame phase and the tape is slowed to correct for the deviation. Accordingly, in instruction S13 the frame phase correction signal is set to a positive fixed value that is sufficient to retard the tape and synchronize the phases of the new and old data. If the count is not equal to 1 or 2 when the read address reset signal is detected, the process is advanced to inquire at S14 if the count is equal to "0" or "4". If the count is equal to 0 or 4, it is assumed that the new data frame phase is delayed relative to the old data frame phase, and the fame phase correction signal is set by instruction S15 to a negative fixed value sufficient to advance the tape and synchronize the phases of the new and old data. If inquiry S14 determines that the count is not equal to 0 or 4, it is assumed that there is no frame phase deviation and the frame phase correction is set to 0 in instruction S16.

Now, the second embodiment of the invention will be described. The second embodiment is compatible with the PAL standard. Unlike NTSC systems, PAL systems do not provide for PF data in the ITI area of recorded tracks. Thus, in PAL systems it is not possible to determine the start of a new frame simply by observing a change in PF data. However, PAL frames are made up of a fixed number of tracks (12) and the sequence of ATF pilot frequencies assigned to those tracks is periodic (period=4 tracks). Iii the second embodiment the ATF pilot signals are monitored to determine when a new frame of original data is being read.

Figure 12:
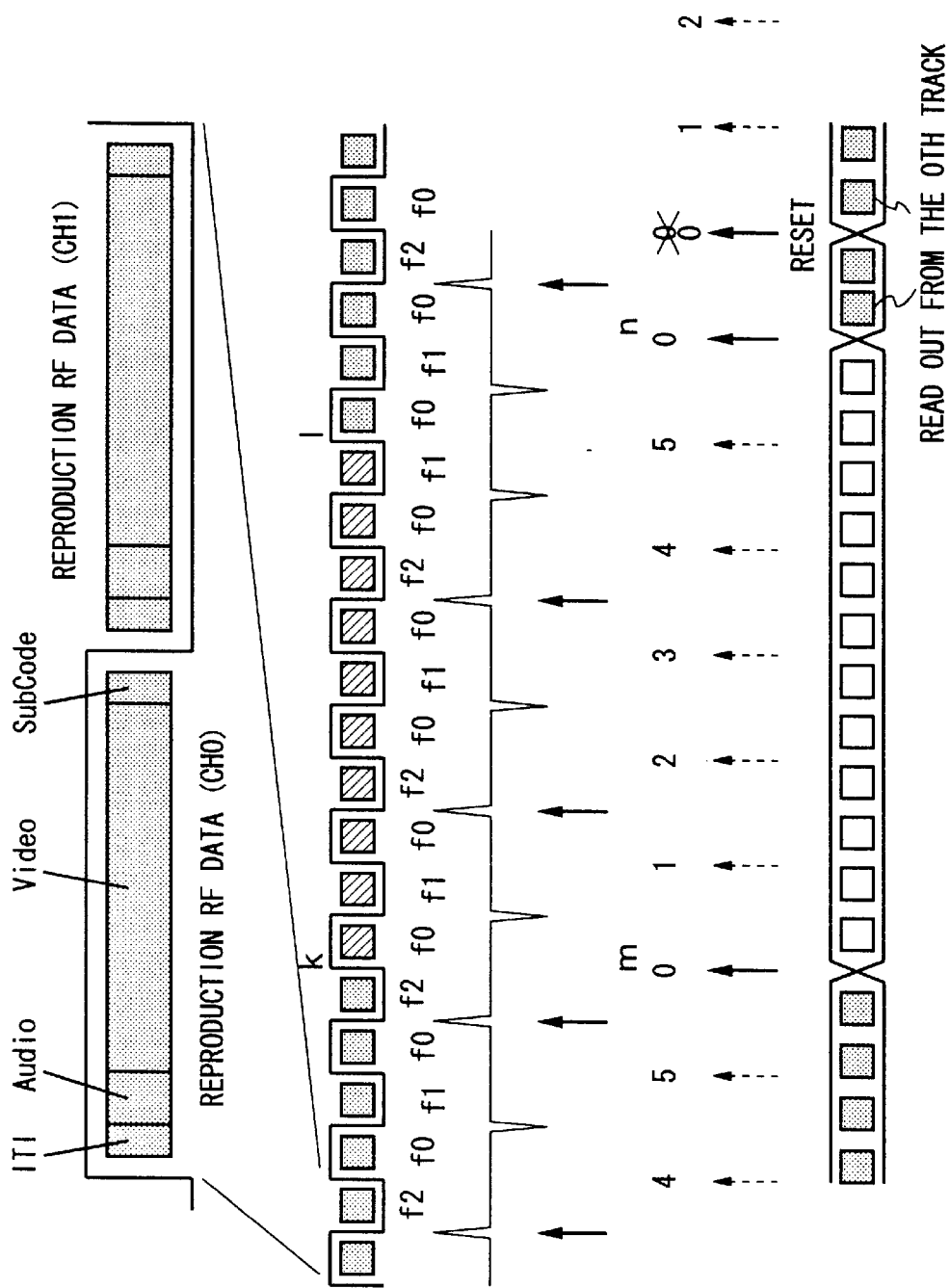
FIG. 12A illustrates the trace of two helical tracks, one by each head of a VCR.
FIG. 12B illustrates a series of traces made by two heads of a VCR in accordance with the PAL standard.
FIG. 12C shows the assignment of pilot signal frequencies to the tracks of FIG. 12B.
FIG. 12D is representative of an internal head switching count maintained by the microcomputer according to a second embodiment of the invention.
FIG. 12E illustrates the timing of an insertion write operation according to a second embodiment of the invention.

FIGS. 12A–12E are timing diagrams useful in describing the second embodiment. FIG. 12A is analogous to FIGS. 8A and 9A. FIG. 12B illustrates how PAL frames are recorded on a magnetic tape. The tracks that make up a PAL frame are recorded to the tape sequentially from the 0th track to the 11th track. In the example of FIG. 12B there is a discontinuity at the point "L", namely the frame situated between points "k" and "l" is incomplete and includes ten tracks instead of twelve. This is discussed in more detail below.

FIG. 12C shows the pilot signal frequencies assigned to each of the tracks of FIG. 12B. In accordance with the previously described ATF scheme, there are three types of pilot signals, an F1 signal of frequency f1, an F2 signal of frequency f2, and an F0 signal having no distinguishable frequency content. These pilot signals are assigned to the PAL tracks in the following repeating sequence: . . . F0, F1, F0, F2 . . . . For a single PAL frame the pilot sequence is: F0, F1, F0, F2, F0, F1, F0, F2, F0, F1, F0, F2.

Also shown in FIG. 12C is a timing diagram representing the polarity of the ATF error signals that are generated by each track of FIG. 12B. The ATF error polarity signals for an F0 track, F1 track, and F2 track are, respectively: None, −Polarity, +Polarity. Accordingly, by observing the polarity of the ATF error signal it may be determined if a scanned track is an F0, F1, or F2 track. Furthermore, since the ATF error signal is communicated to the microcomputer the microcomputer may readily discriminate between F0, F1, and F2 tracks.

The microcomputer uses the ATF error signal information along with an internal head switching counter to synchronize the new data frame phase with the recorded data frame phase. FIG. 12D is representative of the internal head switching count maintained by the microcomputer. The count is increased by 1 every time the leading edge of the head switching signal occurs, and thus a frame having 12 tracks is represented by a count sequence of "0", "1", "2", "3", "4", "5". During AVS insertion a count of "0" causes the microcomputer to send a read address reset signal to the memory. In response to the reset signal the memory begins writing the 0th track of the insert data to the tape. A count of "0" is also the microcomputer's cue to check the most recently read ATF error polarity. If at the time of a "0" count the most recently read pilot signal is an F2 signal, it is assumed that no frame phase deviation has occurred (given the pilot signal sequence for a PAL frame) and the count is allowed to continue uninterrupted. If, on the other hand, at the time of a "0" count, the most recently read pilot signal is not an F2 signal, it is assumed that a frame phase deviation has occurred and the count is held at "0" until the next F2 pilot signal occurs.

FIG. 12E illustrates the timing of the insertion write operation when a discontinuity exists in the original data. At the point denoted by "m" the insertion of a frame of new data is begun. The insertion of the frame is completed at point "n", at which time the count is reset to "0" and insertion of the next frame of new data is begun. However, a check of the ATF polarity at point "n" indicates that the most recently read pilot signal is not an F2 signal. Therefore, the "0" count is held until the next occurrence of an F2 pilot signal is detected, at which time insertion of the next frame of new data is begun anew. In this manner the new data frame phase is matched to the recorded data frame phase. As was the case in the prior described embodiments, following the AVS insertion, the previously recorded frame phase serves as the new frame phase for the newly written data.

Figure 13:
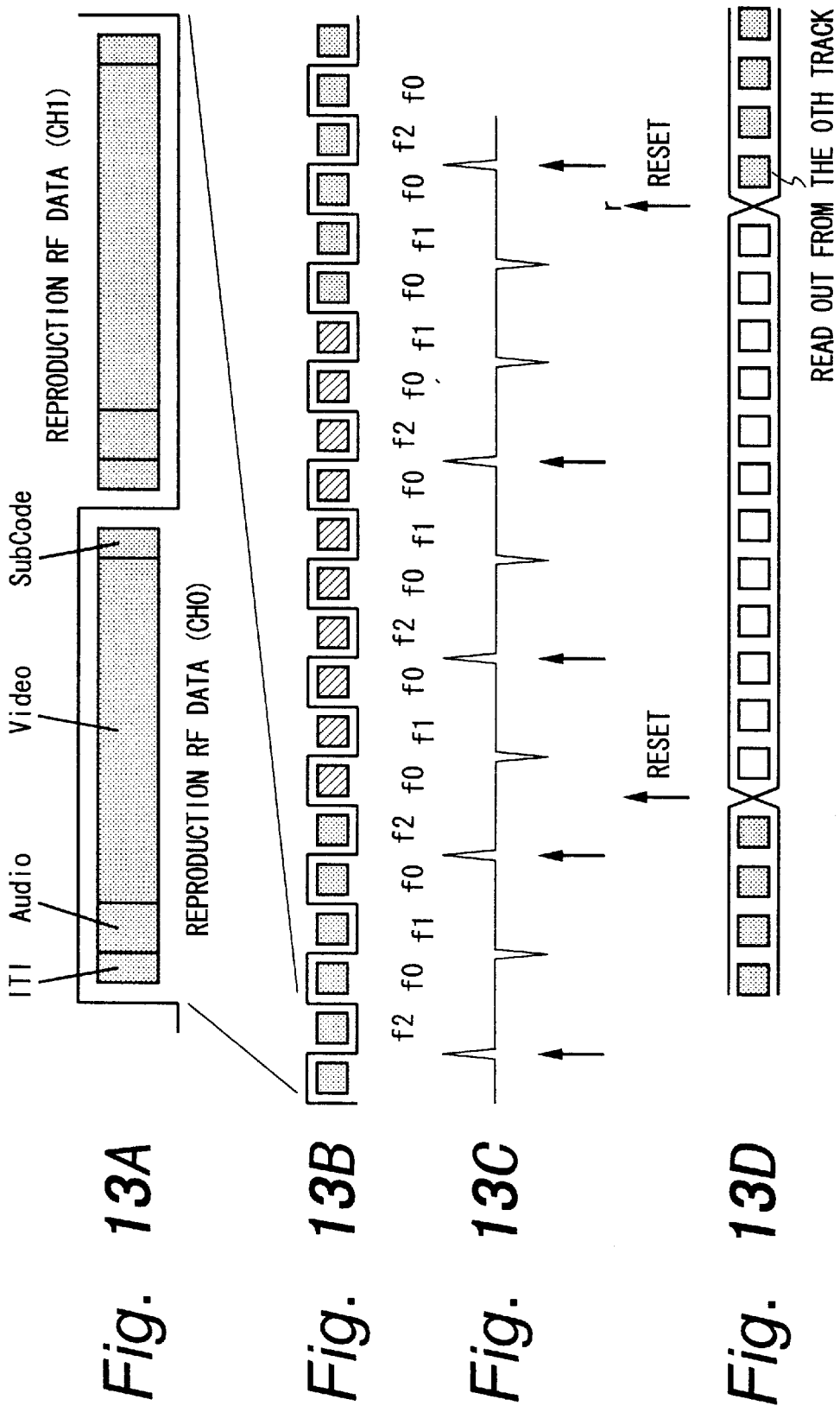
FIGS. 13A–13C repeat what is shown in FIGS. 12A–12C.
FIG. 13D illustrates the timing of an insertion write operation according to a modified second embodiment of the invention.

A modified second embodiment will now be described with reference to FIGS. 13A–13D and 14. As was the case with the unmodified second embodiment, the modified second embodiment is applicable to a PAL system, and is therefore described in the PAL context. FIGS. 13A–13C illustrate how the modified second embodiment is similar to the unmodified second embodiment, in that the ATF pilot signals of the original data are assigned in a periodic fashion, resulting in a periodic ATF pilot polarity. However, in the modified second embodiment, rather than adjusting the write time of the insertion data to conform to the ATF signal period, the tape speed is adjusted so that the ATF signal period of the original data conforms to the write time of the insertion data.

In the modified second embodiment the cue for checking the ATF polarity signal is the read address reset signal. Each time the writing of a new frame of insertion data begins a read address reset signal is generated and the ATF polarity signal is checked to determine the type of the most recently read ATF signal. If the detected ATF signal is all F2 signal it is assumed that the frame phase of the insertion data and the frame phase of the original data match. If the detected ATF signal is not an F2 signal it is assumed that the frame phase of the insertion data and the frame phase of the original data do not match, and a frame phase correction is undertaken.

FIG. 13D in conjunction with FIG. 13C illustrate frame phase mismatch. As can be seen from the figures, a read address reset signal occurs at point "r" during the writing of the insertion data. Upon the occurrence of this reset signal the polarity of the most recently read ATF pilot error signal is checked and the ATF signal is found to be other than F2, necessitating a frame phase correction. The frame phase correction process involves generating a frame phase correction signal which may be substituted in FIG. 10 for the frame phase correction signal computed according to the modified first embodiment. The resulting control algorithm may then be used to control the capstan motor according to the second embodiment.

Figure 14:
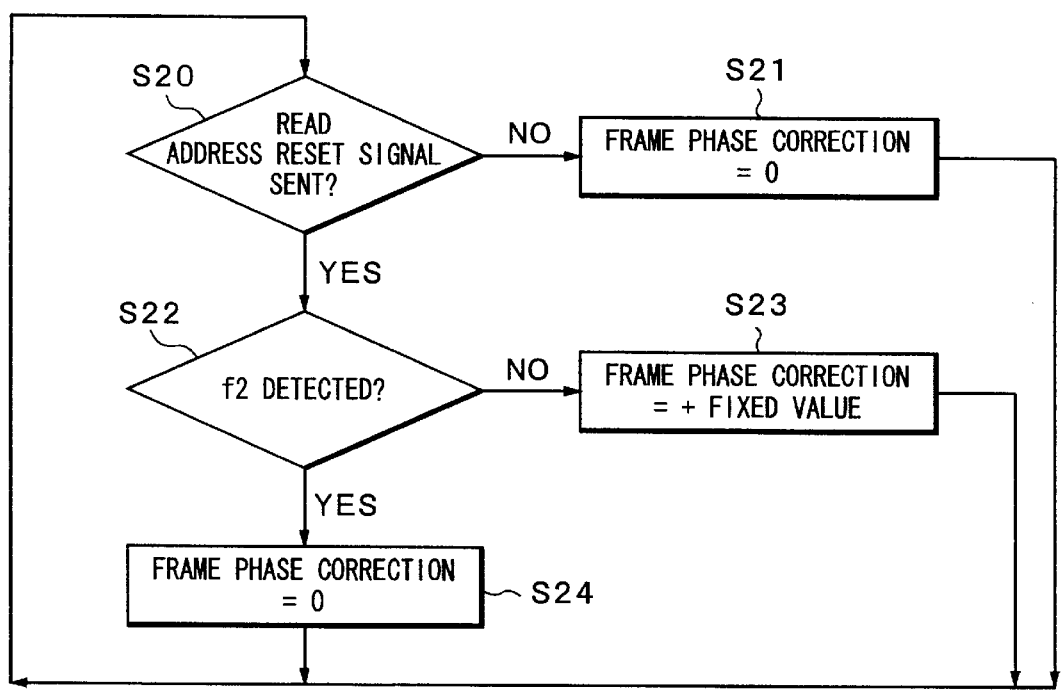
FIG. 14 is a flowchart depicting the steps taken in computing a frame phase correction signal according a modified second embodiment of the invention.

FIG. 14 is a flowchart depicting the steps taken in computing the frame phase correction signal according to the modified second embodiment. Initially, inquiry S20 checks if a read address reset signal has been sent from the microcomputer to the memory. If the read address reset signal has not been detected it is assumed that the track being written is not the 0th track and no frame phase correction is performed. Hence, instruction S21 sets the frame phase correction to 0. When a read address reset signal is detected the most recently read ATF pilot error signal is checked and a determination is made at inquiry S22 as to whether the most recently read ATF signal is an F2 signal. If the detected ATF signal is an F2 signal it is assumed that there is no frame phase deviation between the new and old data, and instruction S24 sets the frame phase correction to 0. If the detected ATF signal is not an F2 signal it is assumed that the frame phase of the insertion data and the frame phase of the original data do not match, and the frame phase correction is set to a predetermined positive fixed value by instruction S23. When this positive fixed value is applied in the control algorithm of FIG. 10 it will have the effect of adjusting the tape speed so as to change the relative frame phase relationship between the new data and old data. Successive corrections of this type may be required before the new data frame phase and recorded data frame phase are synchronized. As was the case in the prior described embodiments, following the AVS insertion, the previously recorded frame phase serves as the new frame phase for the newly written data.

While the present invention has been particularly shown and described in conjunction with preferred embodiments thereof, it will be readily appreciated by those of ordinary skill in the art that various changes may be made without departing from the spirit and scope of the invention. For example, in the above described embodiments, rather then perform a frame phase correction when a frame phase deviation is detected, the AVS insertion may be forcedly stopped. Additionally, the AVS insertion may be forcedly stopped in the absence of a detected ITI background signal and/or ATF error signal.

Moreover, while particular circuits and algorithms have been described as performing various operations, the present invention is not limited solely thereto and other types of circuits, algorithms and/or types of signals may be used.

Therefore, it is intended that the appended claims be interpreted as including the embodiments described herein, the alternatives mentioned above, and all equivalents thereto.

What is claimed is:

1. Apparatus for reading frames of data from and recording frames of data onto multiple slant tracks of a tape, each recorded frame including a multiple of recorded tracks, said apparatus comprising:

means for selectively reading previously recorded data, and for selectively writing new frames of data onto said tape, each new frame including a multiple of new tracks; and means for recording said new data frames onto said tape at a location having previously recorded data thereon, and including:

means for determining a recorded data frame phase for each of said recorded tracks on said tape, said recorded data frame phase indicating a longitudinal position of said recorded tracks on said tape and serving to determine a point on said tape where a recorded frame begins;

means for determining a new data frame phase for each of said new tracks, said new data frame phase indicating a longitudinal position of said new tracks upon recording onto said tape and serving to determine a point where said new frame begins; and means for writing said new frame to said tape at said point on said tape where said recorded frame begins, said writing beginning at said point where said new frame begins; thereby allowing said recorded data frame phase to remain on said tape and to serve as said new data frame phase after said new data frame has been recorded onto said tape.

2. The apparatus according to claim 1, wherein said means for determining a recorded data frame phase comprises:

means for reading a Pilot Frame (PF) data signal for each of said recorded data frames, said PF data signals being included in said previously recorded data and changing on a frame by frame basis; and means for comparing said PF data signals for consecutively read recorded data frames, a change in values of said compared PF data signals indicating the beginning of a new frame of recorded data.

3. The apparatus according to claim 2, wherein said means for writing comprises:

counter means having a count that is increased in response to the reading of said recorded tracks from said tape;

means for writing said new frame to said tape when the count of said counter means reaches a predetermined value; and means for resetting said counter means in response to said change in said compared PF data signals.

4. The apparatus according to claim 1, wherein said means for determining a recorded data frame phase comprises:

counter means having a count that is increased in response to the reading of said recorded tracks from said tape;

means for determining an Automatic Track Finding (ATF) error polarity signal for each of said recorded tracks, each of said ATF error polarity signals having one of a plurality of predetermined values; wherein said ATF polarity signal values alternate periodically on a track by track basis; and means for comparing said ATF error polarity signal to a predetermined desired polarity signal when the count of said counter means reaches a predetermined value, a match between said ATF error polarity signal and said predetermined desired polarity signal indicating the beginning of a new frame of recorded data.

5. Apparatus for reading frames of data from and recording frames of data onto multiple slant tracks of a tape, each recorded frame including a multiple of recorded tracks, said apparatus comprising:

means for selectively reading previously recorded data, and for selectively writing new frames of data onto said tape, each new frame including a multiple of new tracks; and means for recording said new data frames onto said tape at a location having previously recorded data thereon, and including:

means for determining a recorded data frame phase for each of said recorded tracks of previously recorded data on said tape, said recorded data frame phase indicating a longitudinal position of said recorded tracks on said tape and serving to determine a point on said tape where a recorded frame begins;

means for determining a new data frame phase for each of said new tracks, said new data frame phase indicating a longitudinal position of said new tracks upon recording onto said tape and serving to determine a point where said new frame begins;

means for detecting a frame phase difference between said recorded data frame phase and said new data frame phase; and means for adjusting the recording of said new data frame so that said new data frame phase matches said recorded data frame phase; thereby allowing said recorded data frame phase to remain on said tape and to serve as said new data frame phase after said new data frame has been recorded onto said tape.

6. The apparatus according to claim 5, wherein said means for determining a recorded data frame phase comprises:

means for reading a Pilot Frame (PF) data signal for each of said recorded data frames, said PF data signals being included in said previously recorded data and changing on a frame by frame basis; and means for comparing said PF data signals for consecutively read recorded data frames, a change in values of said compared PF data signals indicating the beginning of a new frame of recorded data.

7. The apparatus according to claim 5, wherein said means for determining a recorded data frame phase comprises:

counter means having, a count that is increased in response to the reading of said recorded tracks from said tape;

means for determining an Automatic Track Finding (ATF) error polarity signal for each of said recorded tracks, each of said ATF error polarity signals having one of a plurality of predetermined values; wherein said ATF polarity signal values alternate periodically on a track by track basis; and means for comparing said ATF error polarity signal to a predetermined desired polarity signal when the count of said counter means reaches a predetermined value, a match between said ATF error polarity signal and said predetermined desired polarity signal indicating the beginning of a new frame of recorded data.

8. The apparatus according to claim 5, wherein said means for determining a new data frame phase comprises means for generating a read address reset signal when the first track of a new data frame is to be written to said tape.

9. The apparatus according to claim 8, wherein said means for determining a recorded data frame phase comprises:

means for reading a Pilot Frame (PF) data signal for each of said recorded data frames, said PF data signals being included in said previously recorded data and changing on a frame by frame basis; and means for comparing said PF data signals for consecutively read recorded data frames, a change in values of said compared PF data signals indicating the beginning of a new frame of recorded data.

10. The apparatus according to claim 9, wherein said means for adjusting comprises means for controlling the speed of said tape so that said generation of said read address reset signal and said change in said PF data signal values coincide.

11. The apparatus according to claim 8, wherein said means for determining a recorded data frame phase comprises:

means for determining an Automatic Track Finding (ATF) error polarity signal for each of said recorded tracks, each of said ATF error polarity signals having one of a plurality of predetermined values; wherein said ATF polarity signal values alternate periodically on a track by track basis; and means for comparing said ATF error polarity signal to a predetermined desired polarity signal when the count of said counter means reaches a predetermined value, a match between said ATF error polarity signal and said predetermined desired polarity signal indicating the beginning of a new frame of recorded data.

12. The apparatus according to claim 11, wherein said means for adjusting comprises means for controlling the tape speed so that said generation of said read address reset signal and said match coincide.

13. The apparatus according to claim 5, wherein when said frame phase difference is detected said recording of said new data frames onto said tape is stopped.

14. A method for reading frames of data from and recording frames of data onto multiple slant tracks of a tape, each recorded frame including a multiple of recorded tracks, said method comprising the steps of:

selectively reading previously recorded data, and selectively writing new frames of data onto said tape, each new frame including a multiple of new tracks; and recording said new data frames onto said tape at a location having previously recorded data thereon; wherein said recording includes the steps of:

determining a recorded data frame phase for each of said recorded tracks on said tape, said recorded data frame phase indicating a longitudinal position of said recorded tracks on said tape and serving to determine a point on said tape where a recorded frame begins;

determining a new data frame phase for each of said new tracks, said new data frame phase indicating a longitudinal position of said new tracks upon recording onto said tape and serving to determine a point where said new frame begins; and writing said new frame to said tape at said point on said tape where said recorded frame begins, said writing beginning at said point where said new frame begins; thereby allowing said recorded data frame phase to remain on said tape and to serve as said new data frame phase after said new data frame has been recorded onto said tape.

15. The method according to claim 14, wherein said step of determining a recorded data frame phase comprises the steps of:

reading a Pilot Frame (PF) data signal for each of said recorded data frames, said PF data signals being included in said previously recorded data and changing on a frame by frame basis; and comparing said PF data signals for consecutively read recorded data frames, a change in values of said compared PF data signals indicating the beginning of a new frame of recorded data.

16. The method according to claim 15, wherein said step of writing comprises the steps of:

incrementing a counter in response to the reading of said recorded tracks from said tape;

writing said new frame to said tape when said counter reaches a predetermined value; and resetting said counter in response to said change in said PF data signals.

17. The method according to claim 14, wherein the step of determining a recorded data frame phase comprises the steps of:

incrementing a counter in response to the reading of said recorded tracks from said tape;

determining an Automatic Track Finding (ATF) error polarity signal for each of said recorded tracks, each of said ATF error polarity signals having one of a plurality of predetermined values; wherein said ATF polarity signal values alternate periodically on a track by track basis; and comparing said ATF error polarity signal to a predetermined desired polarity signal when the count of said counter means reaches a predetermined value, a match between said ATF error polarity signal and said predetermined desired polarity signal indicating the beginning of a new frame of recorded data.

18. A method for reading frames of data from and recording frames of data onto multiple slant tracks of a tape, each recorded frame including a multiple of recorded tracks, said method comprising the steps of:

selectively reading previously recorded data, and selectively writing new frames of data onto said tape, each new frame including a multiple of new tracks; and recording said new data frames onto said tape at a location having previously recorded data thereon; wherein said recording includes the steps of:

determining a recorded data frame phase for each of said recorded tracks of previously recorded data on said tape, said recorded data frame phase indicating a longitudinal position of said recorded tracks on said tape and serving to determine a point on said tape where a recorded frame begins;

determining a new data frame phase for each of said new tracks, said new data frame phase indicating a longitudinal position of said new tracks upon recording onto said tape and serving to determine a point where said new frame begins;

detecting a frame phase difference between said recorded data frame phase and said new data frame phase; and adjusting the recording of said new data frame so that said new data frame phase matches said recorded data frame phase; thereby allowing said recorded data frame phase to remain on said tape and to serve as said new data frame phase after said new data frame has been recorded onto said tape.

19. The method according to claim 18, wherein said step of determining a recorded data frame phase comprises the steps of:

reading a Pilot Frame (PF) data signal for each of said recorded data frames, said PF data signals being included in said previously recorded data and changing on a frame by frame basis; and comparing said PF data signals for consecutively read recorded data frames, a change in values of said compared PF data signals indicating the beginning of a new frame of recorded data.

20. The method according to claim 18, wherein said step of determining a recorded data frame phase comprises the steps of:

incrementing a counter that in response to the reading of said recorded tracks from said tape;

determining an Automatic Track Finding (ATF) error polarity signal for each of said recorded tracks, each of said ATF error polarity signals having one of a plurality of predetermined values; wherein said ATF polarity signal values alternate periodically on a track by track basis; and comparing said ATF error polarity signal to a predetermined desired polarity signal when the count of said counter means reaches a predetermined value, a match between said ATF error polarity signal and said predetermined desired polarity signal indicating the beginning of a new frame of recorded data.

21. The method according to claim 18, wherein said step of determining a new data frame phase includes the step of generating a read address reset signal when the first track of a new data frame is to be written to said tape.

22. The method according to claim 21, wherein said step of determining a recorded data frame phase comprises the steps of:

reading a Pilot Frame (PF) data signal for each of said recorded data frames, said PF data signals being included in said previously recorded data and changing on a frame by frame basis; and comparing said PF data signals for consecutively read recorded data frames, a change in values of said compared PF data signals indicating the beginning of a new frame of recorded data.

23. The method according to claim 22, wherein said step of adjusting includes the step of controlling the speed of said tape so that said generation of said read address reset signal and said change in said PF data signal values coincide.

24. The method according to claim 21, wherein said step of determining a recorded data frame phase comprises the steps of:

determining an Automatic Track Finding (ATF) error polarity signal for each of said recorded tracks, each of said ATF error polarity signals having one of a plurality of predetermined values; wherein said ATF polarity signal values alternate periodically on a track by track basis; and comparing said ATF error polarity signal to a predetermined desired polarity signal when the count of said counter means reaches a predetermined value, a match between said ATF error polarity signal and said predetermined desired polarity signal indicating the beginning of a new frame of recorded data.

25. The method according to claim 24, wherein said step of adjusting includes the step of controlling the tape speed so that said generation of said read address reset signal and said match coincide.

26. The method according to claim 18; wherein when said frame phase difference is detected the step of stopping said recording of said new data frames onto said tape is substituted for the step of adjusting.

27. Apparatus for reading frames of data from and recording frames of data onto multiple slant tracks of a tape, each recorded frame including a multiple of recorded tracks, said apparatus comprising:

means for selectively reading previously recorded data, and for selectively writing new frames of data onto said tape, each new frame including a multiple of new tracks; and means for recording said new data frames onto said tape at a location having previously recorded data thereon, and including:

means for reading a Pilot Frame (PF) data signal for each of said recorded data frames, said PF data signals being included in said previously recorded data and changing on a frame by frame basis, and said PF data signals being used to determine a recorded data frame phase for each of said recorded tracks on said tape, said recorded data frame phase indicating a longitudinal position of said recorded tracks on said tape;

means for comparing said PF data signals for consecutively read recorded data frames, a change in values of said compared PF data signals indicating a point on said tape where a recorded frame begins;

means for determining a new data frame phase for each of said new tracks, said new data frame phase indicating a longitudinal position of said new tracks upon recording onto said tape and serving to determine a point where said new frame begins;

counter means having a count that is increased in response to the reading of said tracks from said tape;

means for writing said new frame to said tape when the count of said counter reaches a predetermined value; and means for resetting said counter means in response to said change in said compared PF data signals.

28. Apparatus for reading frames of data from and recording frames of data onto multiple slant tracks of a tape, each recorded frame including a multiple of recorded tracks, said apparatus comprising:

means for selectively reading previously recorded data, and for selectively writing new frames of data onto said tape, each new frame including a multiple of new tracks; and means for recording said new data frames onto said tape at a location having previously recorded data thereon, and including:

counter means having a count that is increased in response to the reading of said recorded tracks from said tape;

means for determining an Automatic Track Finding (ATF) error polarity signal for each of said recorded tracks, each of said ATF error polarity signals having one of a plurality of predetermined values; wherein said ATF polarity signal values alternate periodically on a track by track basis;

means for determining a recorded data frame phase for each of said recorded tracks on said tape by comparing said ATF error polarity signal to a predetermined desired polarity signal when the count of said counter means reaches a predetermined value, said recorded data frame phase indicating a longitudinal position of said recorded tracks on said tape, and a match between said ATF error polarity signal and said predetermined desired polarity signal indicating a point on said tape where a recorded frame begins;

means for determining a new data frame phase for each of said new tracks, said new data frame phase indicating a longitudinal position of said new tracks upon recording onto said tape and serving to determine a point where said new frame begins; and means for writing said new frame to said tape at said point on said tape where said recorded frame begins, said writing beginning at said point where said new frame begins; thereby allowing said recorded data frame phase to remain on said tape and to serve as said new data frame phase after said new data frame has been recorded onto said tape.

29. A method for reading frames of data from and recording frames of data onto multiple slant tracks of a tape, each recorded frame including a multiple of recorded tracks, said method comprising the steps of:

selectively reading previously recorded data, and for selectively writing new frames of data onto said tape, each new frame including a multiple of new tracks; and recording said new data frames onto said tape at a location having previously recorded data thereon, wherein said recording includes the steps of:

reading a Pilot Frame (PF) data signal for each of said recorded data frames, said PF data signals being included in said previously recorded data and changing on a frame by frame basis, and said PF data signals being used to determine a recorded data frame phase for each of said recorded tracks on said tape, said recorded data frame phase indicating a longitudinal position of said recorded tracks on said tape;

comparing said PF data signals for consecutively read recorded data frames, a change in values of said compared PF data signals indicating a point on said tape where a recorded frame begins;

determining a new data frame phase for each of said new tracks, said new data frame phase indicating a longitudinal position of said new tracks upon recording onto said tape and serving to determine a point where said new frame begins;

incrementing a counter in response to the reading of said tracks from said tape;

writing said new frame to said tape when the count of said counter reaches a predetermined value; and resetting said counter in response to said change in said compared PF data signals.

30. A method for reading frames of data from and recording frames of data onto multiple slant tracks of a tape, each recorded frame including a multiple of recorded tracks, said method comprising the steps of:

selectively reading previously recorded data, and for selectively writing new frames of data onto said tape, each new frame including a multiple of new tracks; and recording said new data frames onto said tape at a location having previously recorded data thereon, wherein said recording includes the steps of:

incrementing a counter in response to the reading of said recorded tracks from said tape;

determining an Automatic Track Finding (ATF) error polarity signal for each of said recorded tracks, each of said ATF error polarity signals having one of a plurality of predetermined values; wherein said ATF polarity signal values alternate periodically on a track by track basis;

determining a recorded data frame phase for each of said recorded tracks on said tape by comparing said ATF error polarity signal to a predetermined desired polarity signal when the count of said counter means reaches a predetermined value, said recorded data frame phase indicating a longitudinal position of said recorded tracks on said tape, and a match between said ATF error polarity signal and said predetermined desired polarity signal indicating a point on said tape where a recorded frame begins;

determining a new data frame phase for each of said new tracks, said new data frame phase indicating a longitudinal position of said new tracks upon recording onto said tape and serving to determine a point where said new frame begins; and writing said new frame to said tape at said point on said tape where said recorded frame begins, said writing beginning at said point where said new frame begins; thereby allowing said recorded data frame phase to remain on said tape and to serve as said new data frame phase after said new data frame has been recorded onto said tape.

* * * * *